United States Patent
Punadikar et al.

(10) Patent No.: US 11,438,381 B2
(45) Date of Patent: Sep. 6, 2022

(54) IDENTIFYING SECURITY PROFILES ASSOCIATED WITH ACCESS PROTOCOLS OF SECONDARY STORAGE

(71) Applicant: International Business Machines Corporation, Armonk, NY (US)

(72) Inventors: Sachin C. Punadikar, Pune (IN); Sasikanth Eda, Vijayawada (IN); Anbazhagan Mani, Bangalore (IN); Chhavi Agarwal, Kundalahalli Colony (IN); Archana Ravindar, Lower Palace Orchards (IN)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 16/254,465

(22) Filed: Jan. 22, 2019

(65) Prior Publication Data

US 2020/0236141 A1 Jul. 23, 2020

(51) Int. Cl.
*H04L 29/06* (2006.01)
*H04L 9/40* (2022.01)
*G06F 16/178* (2019.01)
*G06F 16/11* (2019.01)

(52) U.S. Cl.
CPC ............ *H04L 63/20* (2013.01); *G06F 16/119* (2019.01); *G06F 16/178* (2019.01); *H04L 63/101* (2013.01)

(58) Field of Classification Search
CPC ...... H04L 63/20; H04L 63/101; G06F 16/119; G06F 16/178
USPC ............................................................ 726/1
See application file for complete search history.

(56) References Cited

U.S. PATENT DOCUMENTS

| | | | | |
|---|---|---|---|---|
| 6,408,298 B1* | 6/2002 | Van | .................... | G06F 16/10 |
| 7,734,951 B1* | 6/2010 | Balasubramanian | ........................ G06F 11/1435 | 714/6.13 |
| 8,151,360 B1* | 4/2012 | Kishore | .............. | H04L 67/1097 726/28 |
| 9,171,178 B1* | 10/2015 | Banerjee | ............. | H04L 67/1097 |
| 2003/0014554 A1* | 1/2003 | Williamson | ............ | G06F 9/465 719/313 |
| 2010/0250508 A1* | 9/2010 | Erofeev | .............. | G06F 16/1744 707/704 |
| 2010/0332820 A1* | 12/2010 | Matsushima | ........... | G06F 21/10 713/150 |
| 2011/0099548 A1* | 4/2011 | Shen | ................... | G06F 9/45558 718/1 |
| 2012/0059797 A1* | 3/2012 | Prahlad | ................. | G06F 3/0619 707/652 |
| 2014/0075502 A1* | 3/2014 | Aissi | ....................... | G06F 21/60 726/1 |

(Continued)

*Primary Examiner* — Shin-Hon (Eric) Chen
(74) *Attorney, Agent, or Firm* — Kunzler Bean & Adamson (57) ABSTRACT

For migrating data to a remote data repository based on the security protocol capabilities of the remote data repository, a storage module identifies a security profile of a file residing in an on-premise data repository, where the security profile comprises security protocol requirements, matches the identified security profile with an entry in a list of one or more remote data repository providers, each entry comprising a security protocol capability of a corresponding remote data repository provider, and migrates, in response to finding a match of the identified security profile and the identified security protocol capability, the file to the matched remote data repository provider.

17 Claims, 5 Drawing Sheets

(56) References Cited

U.S. PATENT DOCUMENTS

| | | | |
|---|---|---|---|
| 2016/0041995 A1* | 2/2016 | Prinz, III | G06F 16/119 |
| | | | 707/694 |
| 2016/0149888 A1 | 5/2016 | Ancin et al. | |
| 2016/0182570 A1* | 6/2016 | Beard | H04L 63/10 |
| | | | 726/1 |
| 2017/0039218 A1* | 2/2017 | Prahlad | H04L 63/0428 |
| 2017/0104755 A1* | 4/2017 | Arregoces | H04L 63/102 |
| 2017/0118244 A1* | 4/2017 | Bai | H04L 63/0263 |
| 2018/0034856 A1* | 2/2018 | Mallya | H04L 63/10 |
| 2018/0110967 A1* | 4/2018 | Gulachenski | A61M 25/1034 |
| 2020/0034167 A1* | 1/2020 | Parthasarathy | G06F 9/45558 |

* cited by examiner

IDENTIFYING SECURITY PROFILES ASSOCIATED WITH ACCESS PROTOCOLS OF SECONDARY STORAGE

FIELD

The subject matter disclosed herein relates to data storage and more particularly relates to identifying the security profiles of different access protocols and synchronizing data with secondary storage devices or services using the identified security profiles.

BACKGROUND

Organizations can store data on local data storage systems and may utilize remote data storage systems for general storage, backup, disaster recovery, etc. For example, an online retailer may store customer data on a plurality of locally-hosted servers, while storing backup copies of the data on a remote data center in the "cloud." Many different online services provide cloud storage, and each of these services may offer different types of access protocols that each utilize different types of security (i.e., authentication schema). However, certain on-premise objects (i.e., files) may have security policies that are not provided by one or more of the available cloud-storage providers.

BRIEF SUMMARY

A method for identifying security profiles of files to be migrated and matching the security profiles to security protocol capabilities of cloud storage providers is disclosed. An apparatus and computer program product also perform the functions of the method. In certain embodiments, the method includes identifying a security profile of a file residing in an on-premise data repository, where the security profile comprises security protocol requirements, matching the identified security profile with an entry in a list of one or more remote data repository providers, each entry comprising a security protocol capability of a corresponding remote data repository provider, and migrating, in response to finding a match of the identified security profile and the identified security protocol capability, the file to the matched remote data repository provider.

The method may also include analyzing the security protocol capabilities of each known remote data repository provider, identifying a one remote data repository provider from the known remote data repository providers having security protocol capabilities that match the security profile of the file, and creating a namespace on the identified one remote data repository provider having security protocol capabilities that match the security profile. In certain embodiments, the method includes migrating the file to the created namespace.

In some embodiments, the method may include updating the list with an entry corresponding to the created namespace and the corresponding security protocol capabilities. Additionally, the method may include detecting a new security profile applied to the file and determine if the security protocol capability of the remote data repository complies with the new security profile. In response to a determination that the security protocol capability of the remote data repository does not comply with the new security profile, the method may include identifying from the list of one or more remote data repository providers a new remote data repository provider that does comply with the new security profile, and migrating the file to the new remote data repository provider.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Disclosed herein are various embodiments providing methods, systems, and computer program products that can identify the available security protocols of different remote secondary storage services and select one of the remote secondary storage services based on a security profile requirement. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present technology are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
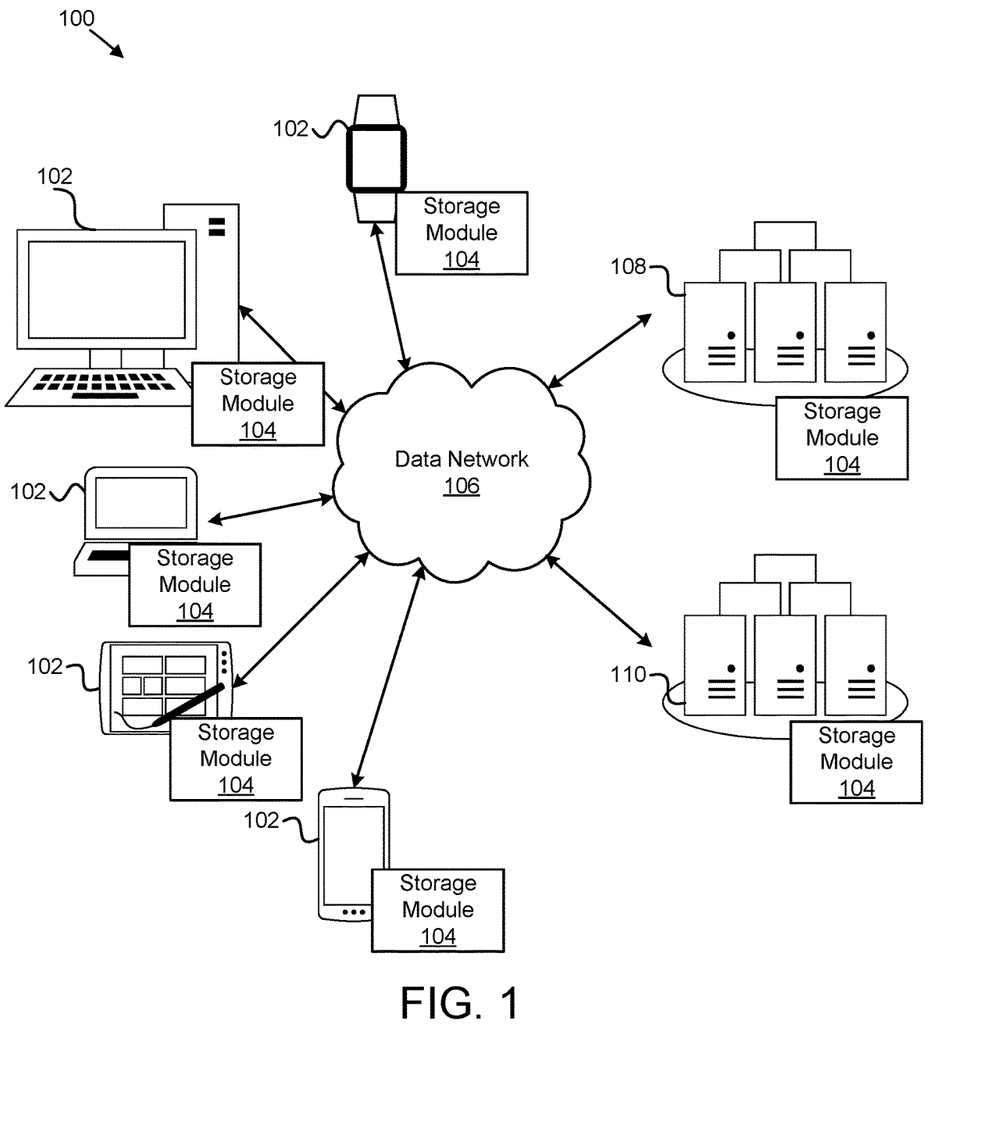
FIG. 1 depicts one embodiment of a system for utilizing network-accessible storage repositories.

FIG. 1 depicts one embodiment of a system 100 for utilizing network-accessible storage repositories. In one embodiment, the system 100 includes one or more information handling devices 102, one or more storage modules 104, one or more data networks 106, one or more primary data repositories 108, and/or one or more secondary data repositories 110. In certain embodiments, even though a specific number of information handling devices 102, storage modules 104, data networks 106, primary data repositories 108, and secondary data repositories 110 are depicted in FIG. 1, one of skill in the art will recognize, in light of this disclosure, that any number of information handling devices 102, storage modules 104, data networks 106, primary data repositories 108, and secondary data repositories 110 may be included in the system 100.

In one embodiment, the information handing devices 102 may include one or more of a server, a desktop computer, a laptop computer, a tablet computer, a smart phone, a set-top box, a gaming console, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to the primary data repository 108 and/or a secondary data repository 110 via a data network 106, described below. The information handling devices 102, in a further embodiment, are capable of executing various programs, program code, applications, instructions, functions, or the like, which may access, store, download, upload, and/or the like data located on the primary data repository 108 and/or the secondary data repository 110.

As will be described below in greater detail, each data repository may be located in a data center, or distributed across many data centers, and is accessible over the data network 106, in an arrangement that is often referred to as "cloud storage" or "transparent cloud tiering." Transparent cloud tiering provides hybrid cloud storage capability to seamlessly migrate data from traditional file systems to an online (or "cloud") storage provider that is defined as a tier within the traditional on-premise file system. Alternatively, one of the data repositories 108 may be an on-premise file/object storage system that implements the other data repository 110 as a tiered cloud provider.

The primary data repository 108, in one embodiment, may comprise one or more servers, or other data storage devices, that include volatile and non-volatile storage media for storing data. The data may include documents, images, videos, audio files, metadata, or the like. The data may be stored in a file system, as objects, as blocks, and/or the like. The primary data repository 108 may be located in a data center either on the premises of an organization and/or in the cloud such that data is accessed via a data network 106 like the Internet. The primary data repository 108, in one embodiment, is the primary data storage point for one or more entities, applications, programs, and/or the like for storage and access of data used by the one or more entities, applications, programs, and/or the like. The data stored on the primary data repository 108 may be stored in a compressed format, e.g., the data may be compressed using various data compression methods such as data deduplication.

Similarly, the secondary data repository 110 may comprise one or more servers, or other storage devices, that include volatile and non-volatile storage media for storing data. The data may include documents, images, videos, audio files, metadata, or the like. The data may be stored in a file system, as objects, as blocks, and/or the like. The secondary data repository 110 may store data received from the primary data repository 108, e.g., the data may be "pushed," automatically or manually, from the primary data repository 108 to the secondary data repository 110. The secondary data repository 110 may be located in a data center either on the premises of an organization and/or in the cloud such that data is accessed via a data network 106 like the Internet. The secondary data repository 110, in one embodiment, is configured as a backup storage system, a disaster recovery system, a data restore system, and/or the like.

Together, the primary data repository 108 and the secondary data repository 110 may comprise a hybrid cloud storage system. For example, the primary data repository 108 may be a private cloud storage system located on the premises of a company, and the secondary data repository 110 may be a public cloud storage system (e.g., Amazon AWS®, Microsoft Azure®, object storage, etc.). Workloads may be split between the devices of the private and public clouds. A data repository 108, 110 may be split between the public and private clouds, workloads and/or data may be manually or automatically shifted between the public and private clouds, and/or the like. As described below, migrating data between the primary data repository 108 and the secondary data repository 110 is done transparent to an application that is using the data such that the application is unaware that data is being moved between the data repositories 108, 110.

In one embodiment, a storage module 104 identifies files (or objects) that are candidates for migration from an on-premise file repository to a cloud tier. As will be discussed in greater detail below with reference to FIG. 2, the storage module 104 is further configured to identify security profiles of the identified files, compare the identified security profiles to the security capabilities of online storage providers, and migrate the identified files to the online storage provider that supports the identified security profiles. It is contemplated that each of the identified files may have a different security profile, and depending on the security capabilities of the different storage providers, it is also contemplated that the identified files for migration may each be migrated to a different storage provider.

In various embodiments, the storage module 104 may be embodied as a hardware appliance that can be installed or deployed in a primary data repository 108, a secondary data repository 110, on an information handling device 102, or elsewhere on the data network 106. In certain embodiments, the storage module 104 may comprise a hardware device such as a secure hardware dongle or other hardware appliance device (e.g., a set-top box, a network appliance, or the like) that attaches to device of the primary data repository 108, the secondary data repository 110, another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort, VGA port, DVI port, or the like), and/or the like. A hardware appliance of the storage module 104 may comprise a power interface, a wired and/or wireless network interface, a graphical interface that attaches to a display, and/or a semiconductor integrated circuit device as described below, configured to perform the functions described herein with regard to the storage module 104.

The storage module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the storage module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the storage module 104.

The semiconductor integrated circuit device or other hardware appliance of the storage module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the security module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

Figure 2:
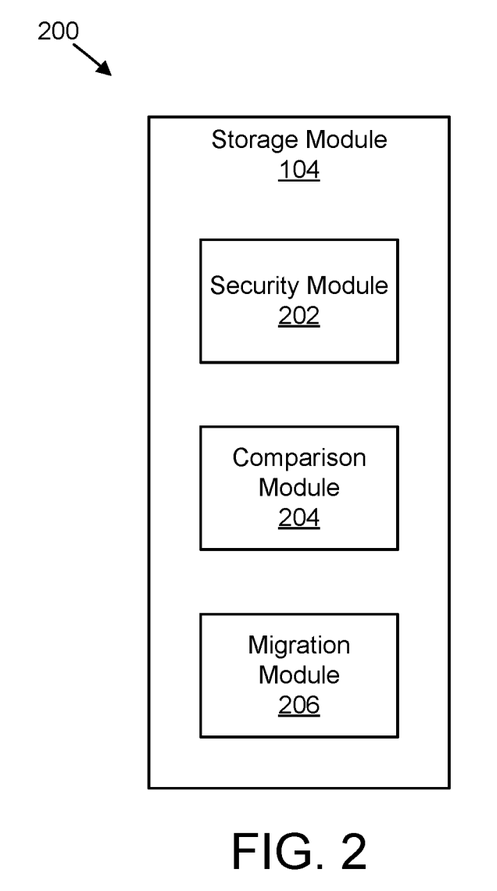
FIG. 2 is a schematic block diagram illustrating another embodiment of a storage module in accordance with embodiments of the present disclosure.

FIG. 2 is a schematic block diagram illustrating another embodiment of the storage module 104 in accordance with embodiments of the present disclosure. The storage module 104, in certain embodiments, includes a security module 202, a comparison module 204, and a migration module 206.

In certain embodiments, the storage module 104 is configured to determine when a file, data object, or data segment should be migrated to the cloud storage tier (i.e., remote storage repository). The storage module 104 may make this determination based on a storage policy that, for example, dictates that files are migrated to the cloud storage tier after not being accessed for a predetermined amount of time. Many other types of migration policies are contemplated, including, but not limited to, an age of the data segment since creation, age of the data segment on the primary data repository 108, the age since the data was last referenced, etc. Alternatively, the storage module 104 synchronizes data from the on-premise storage repository to the remote storage repository (i.e., secondary data repository 110) as a backup.

The security module 202, in some embodiments, is configured to analyze files/data objects to determine the security profile of the files. One example of determining the security profile of a file includes analyzing the metadata of the file. Another example includes analyzing extended file attributes ("xattr") for attributes related to security features. Each file stored in the primary data repository 108 may be assigned a different security profile or the same security profile. Alternatively, the security profile may be assigned by an administrator, an end user, an application that accesses the file, etc. Examples of security profiles include different security protocols that are to be applied to one or more files, including but not limited to, encryption of data at rest, password protection, encrypted disks, password masking, required control access protocols (i.e., NFS-Kerberos, CIFS-AD, AD RFC-2307, etc.), multi-factor authentication, etc.

The security module 202 is further configured to analyze the security capabilities of the different online storage providers. Examples of online storage providers include, but are not limited to, Google of Mountain View, Calif., Microsoft (Azure) of Redmond, Wash., Amazon (AWS) of Seattle, Wash., and IBM of Armonk, N.Y. Each online storage provider may have various security protocols available to the storage users. While these security protocols may match up with the security profiles required by the user, often times the security protocols do not. Beneficially, the storage module 104 is configured to match required security profiles with security protocols of the online or cloud storage providers.

The security module 202 identifies the available security protocols of the various cloud storage providers by, for example, analyzing application programming interfaces ("APIs") provided by the cloud storage providers. The security module 202 may maintain a list or table of storage provider capabilities, and update the list from time to time as new security capabilities are introduced by the cloud storage providers. An example of the list includes:

```
Google_cloud_capabilities = {disk_enc_at_rest: enc_at_rest,
passwd_protected: set_passwd, Kerberos: two_factor}
Azure_cloud_capabilities = {AD: AD_RFC_2307}
AWS_cloud_capabilities = {AD: IAM, LDAP: OpenLDAP}
IBM_cloud_capabilities = {disk_enc_at_rest: enc_at_rest,
Kerberos:two_factor, AD:AD, LDAP:w3id{
```

The security module 202 may further maintain a mapping of on-premise security profile requirements with the equivalent security protocol of the cloud storage provider in the event that there is a mismatch in the naming schema of the security profiles as compared to the security protocols of the cloud storage provider.

The comparison module 204 is configured to compare the security profile of a file with the available security protocols of the cloud storage providers, and select a cloud storage provider based on the comparison. For example, if a file has a security profile that requires two-factor authentication, the comparison module 204 is configured to select the cloud storage provider that also provides two-factor authentication as a security protocol. In the event that multiple cloud storage providers have the security protocols as defined by the security profile, the comparison module 204 may be configured to utilize other business logic in making a selection. Examples of business logic may include, but are not limited to, cost, bandwidth caps, availability, proximity to the on-premise data repository, etc.

The migration module 306 is configured to migrate the data in response to the determination of the comparison module 206 that the date (i.e., files) are candidates for migration and that there is a cloud storage provider that matches the security profile of the candidate files. In some embodiments, the migration module 206 migrates (or syncs a copy of) data segments directly from the primary data repository 108 to the secondary data repository 110 (i.e., a cloud storage provider) over the data network 106.

In some embodiments, the migration module 206 utilizes various application programming interfaces ("APIs") to migrate data segments, files, objects, of the like, between the primary data repository 108 and the secondary data repository 110. For example, the migration module 206 may use representational state transfer ("REST") APIs to PUT or GET data segments. Other APIs may be provided by the provider of the secondary data repository 110, such as Amazon® or Rackspace®.

In certain embodiments, after the migration module 206 migrates the files/data segments to the cloud storage provider, the files moved may have data stored on both the primary data repository 108 and the secondary data repository 110. For example, a file stub or pointer may remain in the on-premise data repository that points to a location on the cloud storage provider where the file is accessible. The file stub may also include a copy of the metadata or file attributes of the migrated file. However, the actual location of the file is transparent to an application using the data and/or an entity that refers to the data such that the application or entity is not aware of where the data is stored. This transparency is sometimes referred to as "transparent cloud tiering."

In further embodiments, the migration module 206 is configured to create a logical namespace within the cloud storage provider to which a security profile may be applied. Multiple different logical namespaces may be implemented with the same cloud storage provider by the migration module 206. For example, if a cloud storage provider is capable of implementing all practical security protocols, but only a subset of all the security protocols is required for one set of files, and a different subset of security protocols is required for another set of files, the migration module 206 is configured to create multiple logical namespaces that each correspond to one of the sets of data. Continuing this example, the migration module 206 may create a "D:" drive with two-factor authentication enabled that corresponds to the first set of files, and an "E:" drive with encryption at rest and simple password protection enabled. The migration module 206 is configured to maintain a list of these federated namespaces and their enabled protocols. For example, this list may be implemented as:

```
Google_cloud_current_state = {Account_user1: Account_enc_at_rest,
Account_passwd_protected, Account_two_factor}
Azure_cloud_current_state = {Account_user1:
Account_AD_RFC_2307}
AWS_cloud_current_state = {Account_user1: Account_IAM,
Account_user1: Account_OpenLDAP}
IBM_cloud_current_state = {Account_user1: Account_enc_at_rest,
Account_two_factor, Account_AD, Account_w3id}
```

Figure 3:
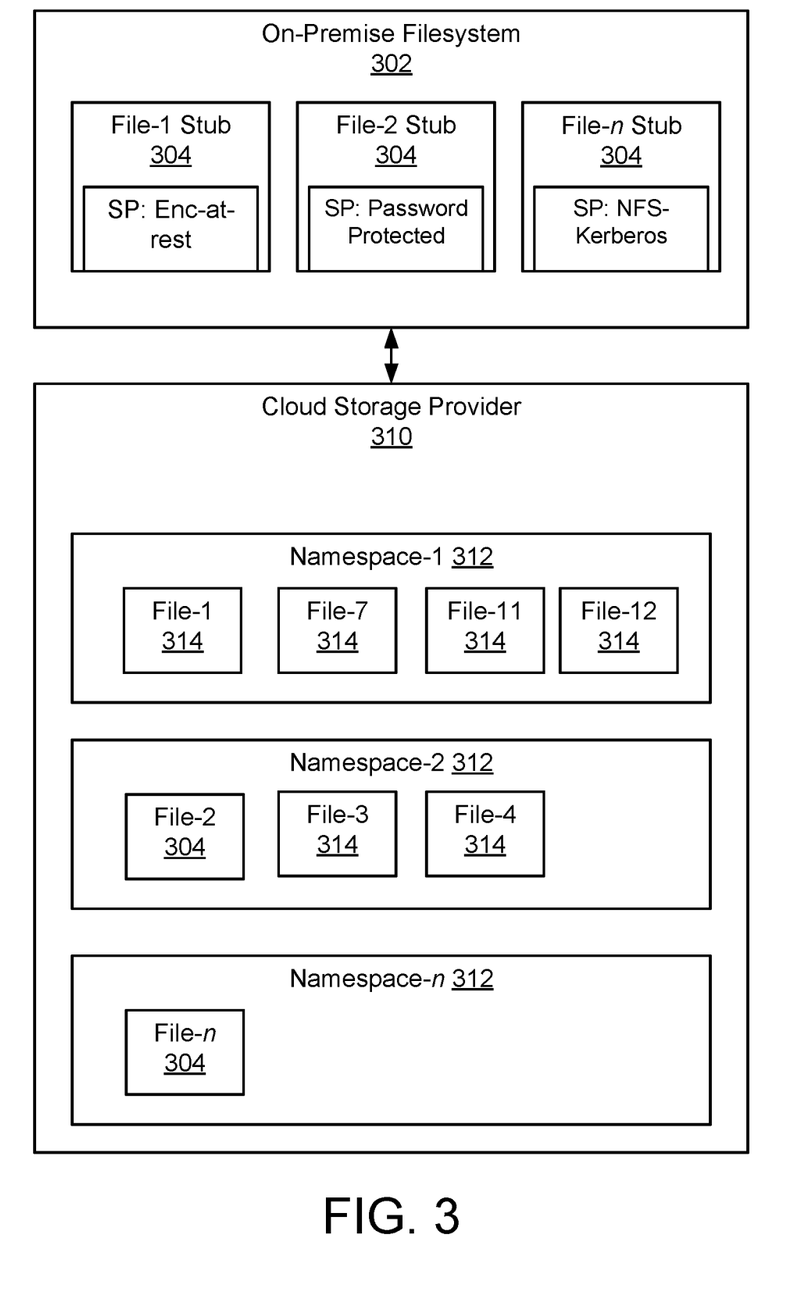
FIG. 3 is a schematic block diagram illustrating one embodiment of an on-premise filesystem and a cloud storage provider in accordance with embodiments of the present disclosure.

FIG. 3 is a schematic block diagram illustrating one embodiment of an on-premise filesystem and a cloud storage provider in accordance with embodiments of the present disclosure. The depicted embodiment is illustrative of files 304 that have been migrated to one of many available cloud storage providers 310. As discussed above, upon migration, a file stub 304 may remain in the on-premise filesystem 302 so that a user or application is able to transparently (i.e., without knowledge of the actual location of the file) access the file. For example, the file-1 stub 304 may reference file-1 314 in namespace-1 312.

The file stubs 304 may include the security profile (depicted as "SP") which indicates the security protocols that are to be applied to the file. Each file may have 0 or more required security protocols, although here for the sake of clarity, each file stub 304 is depicted with a single security protocol. The cloud storage provider 310 may include multiple federated namespaces 312. Each namespace (e.g., namespace-1 312) may be configured with a set of the available security protocols that match the security profile of one or more files stubs 304 (which were originally files 314 before migration).

Although a single cloud storage provider 310 is depicted here, as has been described above, the storage module 104 is capable of communicating with multiple cloud storage providers 310 and creating one or more namespaces on each cloud storage provider 312. The storage module 104 maintains a list of the capabilities of the different cloud storage providers 312, and the different namespaces/accounts created with each of the various cloud storage provider 312.

Figure 4:
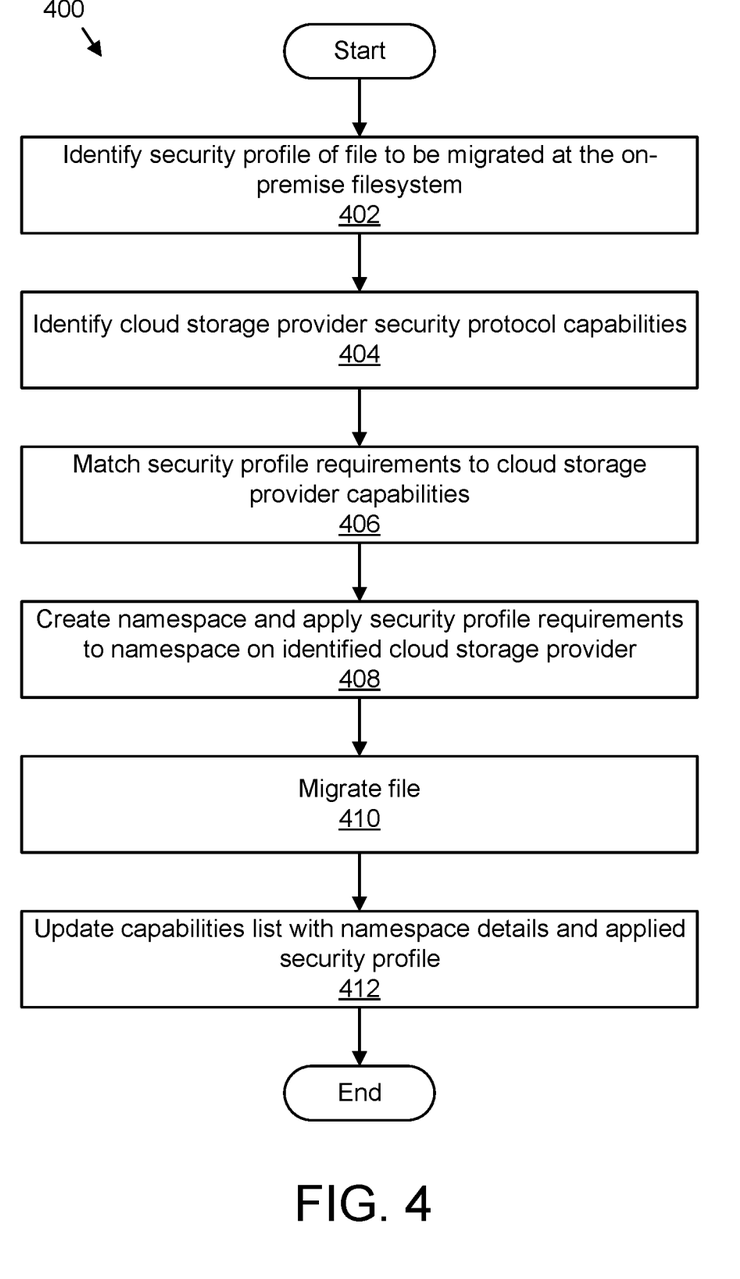
FIG. 4 is a flowchart diagram illustrating one embodiment of a method for initial transparent cloud tiering in accordance with embodiments of the present disclosure.

FIG. 4 is a flowchart diagram illustrating one embodiment of a method 400 for initial transparent cloud tiering in accordance with embodiments of the present disclosure. In other words, the method 400 depicts the steps which may be performed to initialize a namespace. The method 400 may be performed by processing logic that may comprise hardware (e.g., circuitry, dedicated logic, programmable logic, microcode, etc.), software (such as instructions run on a processing device), firmware, or a combination thereof. In one embodiment, the method 400 is performed by the storage manager 104.

The method 400 starts and the processing logic, at block 402 identifies a security profile of a file in the on-premise data repository that is to be migrated to a remote data repository (cloud storage provider). In certain embodiments, the processing logic identifies the security profile of the file by analyzing the data and/or metadata of the file. Additionally, extended attributes of the file may indicate the required security profile. As described above, the required security profile may specify one or more security profiles to be used when accessing, moving, or storing the data.

At block 404, the processing logic analyzes the security protocol capabilities of the various cloud storage providers known to the processing logic. For example, the processing logic may analyze APIs of the cloud storage providers to identify which security protocols each cloud storage provider supports. The processing logic, at block 406, matches the security profile requirements of the file with the security protocol capabilities of the cloud storage provider. As discussed previously, if more than one cloud storage provider matches the required security protocol capabilities, other business logic may be utilized to select a cloud storage provider.

At block 408, the processing logic creates a namespace on the selected cloud storage provider and applies the required security protocols of the security profile. The processing logic then, at block 410, migrates the file from the on-premise data repository to the federated namespace of the selected cloud storage provider. At block 412, the processing logic updates a capabilities list (i.e., capabilities filter) with the created namespace and applied security profile. The method 400 then ends.

Figure 5:
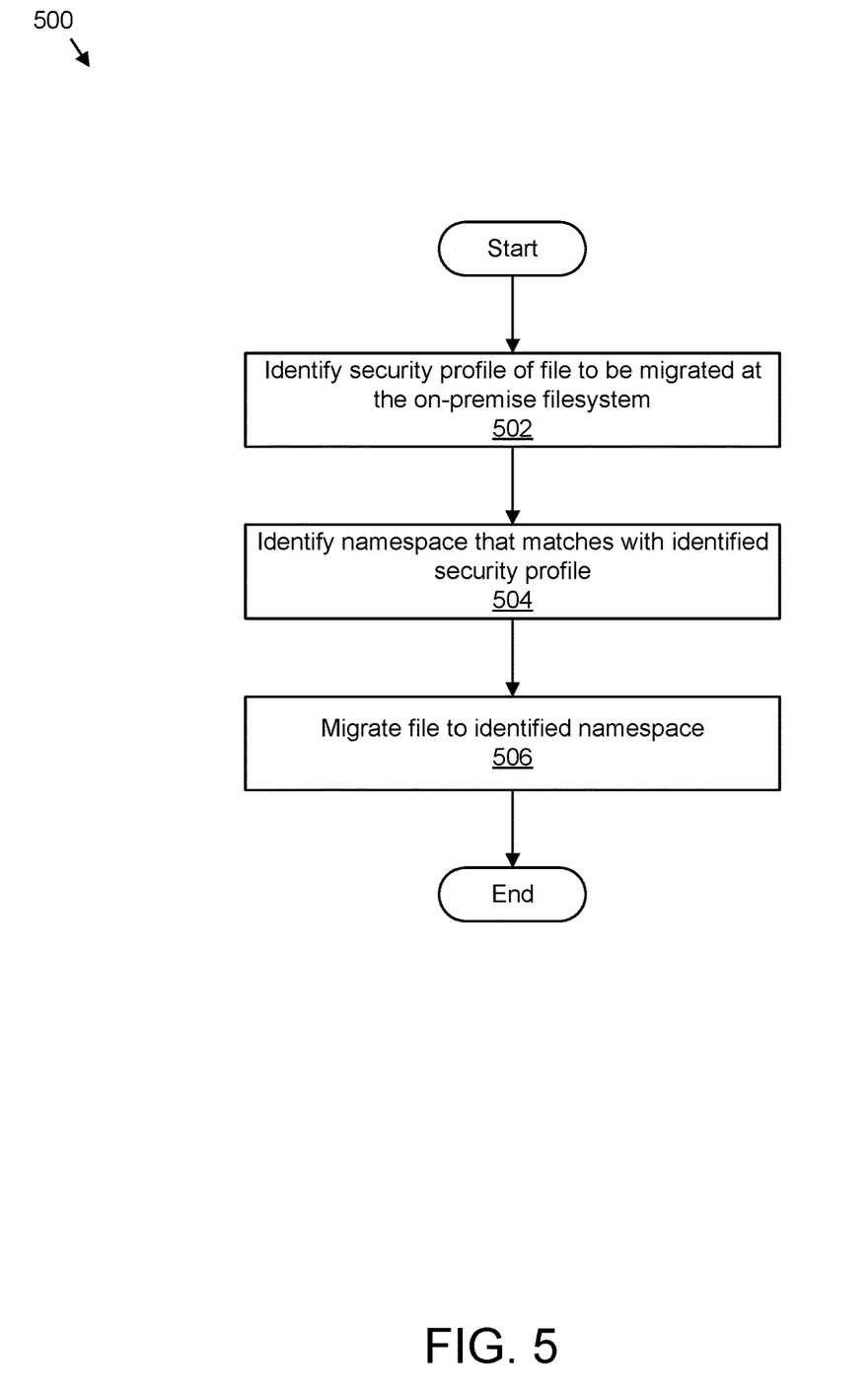
FIG. 5 is a flowchart diagram illustrating one embodiment of a method for transparent cloud tiering in accordance with embodiments of the present disclosure.

FIG. 5 is a flowchart diagram illustrating one embodiment of a method 500 for transparent cloud tiering in accordance with embodiments of the present disclosure. In other words, the method 500 depicts the steps which may be performed after namespaces have been created. The method 500 may be performed by processing logic that may comprise hardware (e.g., circuitry, dedicated logic, programmable logic, microcode, etc.), software (such as instructions run on a processing device), firmware, or a combination thereof. In one embodiment, the method 500 is performed by the storage manager 104.

The method 500 starts and the processing logic, at block 502, identifies a security profile of a file to be migrated from the on-premise data repository to the cloud storage provider. The processing logic, additionally, may compare the identified security profile to a capability list that identifies the namespaces and security protocol capabilities of each known cloud storage provider. At block 504, the processing logic identifies the namespace having security protocol capabilities that match the identified security profile. At block 506, the processing logic migrates the file to the identified namespace. In another embodiment, the processing logic may replace the file on the on-premise data repository with a file stub that contains information indicating the new location of the file, and metadata associated with the file.

In another embodiment, the processing logic also identifies when a previously migrated file has a new security profile applied, and if the namespace corresponding to the previously migrated file still complies with the new security profile. If not, the processing logic is configured to migrate the file to a new namespace that complies with the new security profile, update the file stub information, and if necessary, update the capabilities list. Additionally, if a namespace does not exist that complies with the new security profile, the processing logic may perform the method 400 to initialize a new namespace that does comply.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
one or more processors;
one or more non-transitory computer-readable storage media, the one or more non-transitory computer readable storage media comprising executable code, that when executed by the one or more processors, causes the one or more processors to:
identify a security profile of a file residing in an on-premise data repository, where the security profile comprises security protocol requirements;
match the identified security profile with an entry in a list of one or more remote data repository providers, each entry comprising a security protocol capability of a corresponding remote data repository provider, and in response to not finding a match analyze the security protocol capabilities of each known remote data repository provider and identify a one remote data repository provider having security protocol capabilities that match the security profile;
migrate, in response to finding a match of the identified security profile and the identified security protocol capability, the file to the matched remote data repository provider;
create a namespace, in response to the namespace not existing, on the matched remote data repository provider having security protocol capabilities that match the security profile; and
replace the file in the on-premise data repository with a file stub that identifies a location of the file in the matched data repository provider.

2. The apparatus of claim 1, where each remote data repository comprises
one or more logical namespaces for storing data.

3. The apparatus of claim 2, where each of the one or more logical namespaces comprises a set of security protocol capabilities selected from all available security protocol capabilities of the remote data repository.

4. The apparatus of claim 1, where the executable code causes the one or more processors to migrate the file to the created namespace.

5. The apparatus of claim 4, where the executable code causes the one or more processors to update the list with an entry corresponding to the created namespace and the corresponding security protocol capabilities.

6. The apparatus of claim 1, where the executable code causes the one or more processors to detect a new security profile applied to the file and determine if the security protocol capability of the remote data repository complies with the new security profile.

7. The apparatus of claim 6, where the executable code causes the one or more processors to, in response to a determination that the security protocol capability of the remote data repository does not comply with the new security profile, identify from the list of one or more remote data repository providers a new remote data repository provider that does comply with the new security profile.

8. The apparatus of claim 7, where the executable code causes the one or more processors to migrate the file to the new remote data repository provider.

9. A method comprising:
identifying a security profile of a file residing in an on-premise data repository, where the security profile comprises security protocol requirements;
matching the identified security profile with an entry in a list of one or more remote data repository providers, each entry comprising a security protocol capability of a corresponding remote data repository provider, and in response to not finding a match analyzing the security protocol capabilities of each known remote data repository provider and identifying a one remote data repository provider having security protocol capabilities that match the security profile;
migrating, in response to finding a match of the identified security profile and the identified security protocol capability, the file to the matched remote data repository provider;
creating a namespace, in response to the namespace not existing, on the matched remote data repository provider having security capabilities that match the security profile; and
replacing the file in the on-premise data repository with a file stub that identifies a location of the file in the matched data provider.

10. The method of claim 9, where each remote data repository comprises one or more logical namespaces for storing data.

11. The method of claim 10, where each of the one or more logical namespaces comprises a set of security protocol capabilities selected from all available security protocol capabilities of the remote data repository.

12. The method of claim 9, further comprising migrating the file to the created namespace.

13. The method of claim 12, further comprising updating the list with an entry corresponding to the created namespace and the corresponding security protocol capabilities.

14. The method of claim 9, further comprising detecting a new security profile applied to the file and determine if the security protocol capability of the remote data repository complies with the new security profile.

15. The method of claim 14, further comprising, in response to a determination that the security protocol capability of the remote data repository does not comply with the new security profile, identifying from the list of one or more remote data repository providers a new remote data repository provider that does comply with the new security profile.

16. The method of claim 15, further comprising migrating the file to the new remote data repository provider.

17. A computer program product, the computer program product comprising a non-transitory computer readable storage medium having program instructions embodied therewith, the program instructions readable/executable by a processor to cause the processor to:
identify a security profile of a file residing in an on-premise data repository, where the security profile comprises security protocol requirements;
match the identified security profile with an entry in a list of one or more remote data repository providers, each entry comprising a security protocol capability of a corresponding remote data repository provider;
migrate, in response to finding a match of the identified security profile and the identified security protocol capability, the file to the matched remote data repository provider, and in response to not finding a match analyze the security protocol capabilities of each known remote data repository provider and identify a one remote data repository provider having security protocol capabilities that match the security profile;
create a namespace, in response to the namespace not existing, on the matched remote data repository provider having security capabilities that match the security profile and
replacing the file in the on-premise data repository with a file stub that identifies a location of the file in the matched data repository provider.

* * * * *